Jan. 16, 1945.　　J. S. REECE　　2,367,311
VACUUM FEEDER
Filed April 30, 1942
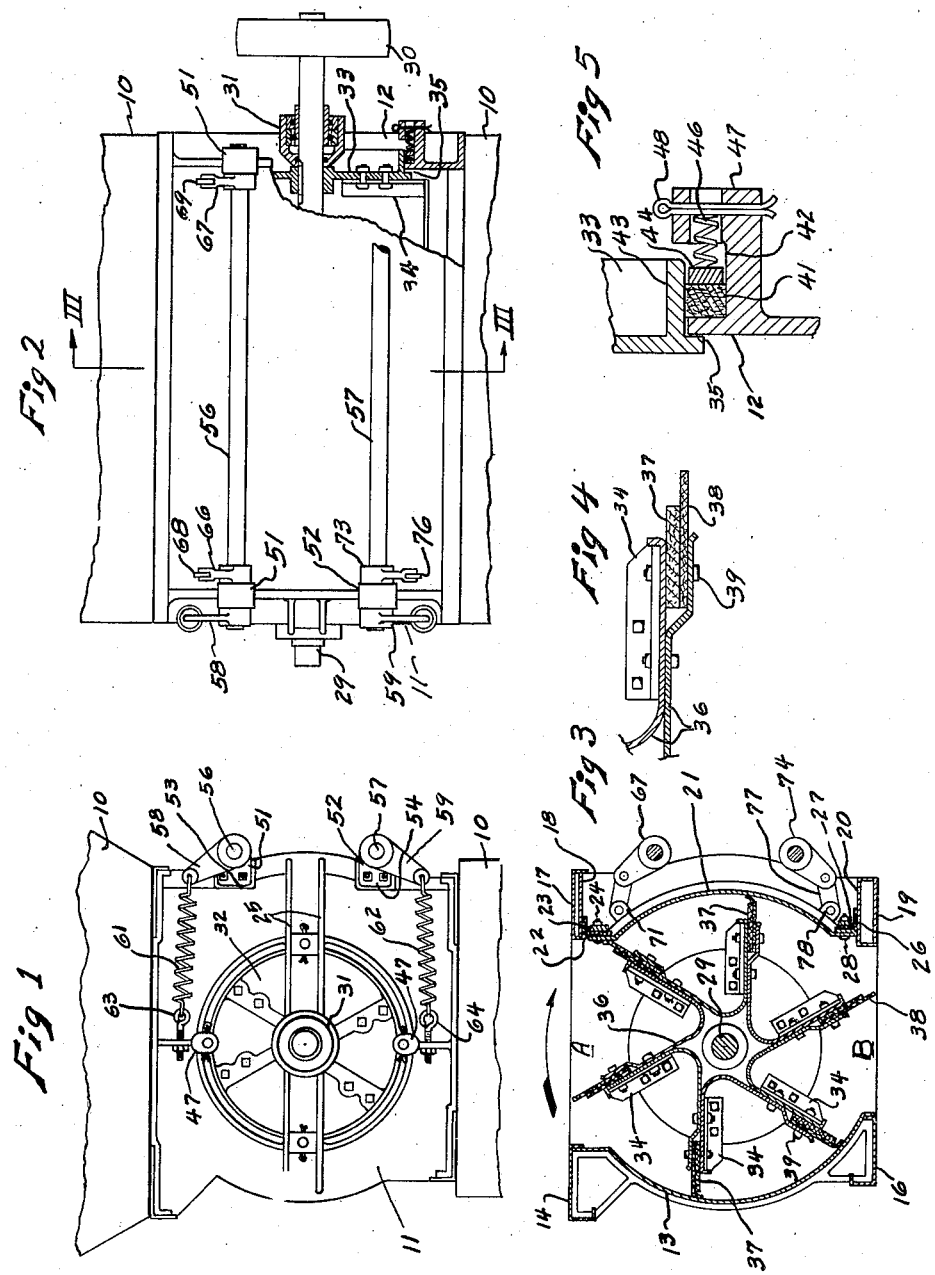
INVENTOR
JAMES S. REECE
BY
Henry L. Jennings
ATTORNEY Patented Jan. 16, 1945

2,367,311

UNITED STATES PATENT OFFICE 2,367,311

VACUUM FEEDER

James S. Reece, Birmingham, Ala., assignor to Continental Gin Company, a corporation of Delaware Application April 30, 1942, Serial No. 441,198

2 Claims. (Cl. 222—338)

This invention relates to a vacuum feeder for use with various apparatus wherein it is desired to introduce material into or remove it from an enclosed chamber where a pressure is maintained different from that outside the chamber. In particular, such feeders are employed extensively in drying apparatus, cleaning apparatus, in separators for air borne cotton and cotton seed, and many other different apparatus. One of the objects of my invention is to provide a vacuum feeder which is separate from, and may be attached to and used in connection with various such apparatus.

A further object of my invention is to provide a vacuum feeder having a movable side wall for permitting large lumps of material being handled, or large foreign objects, to pass through the feeder without doing damage to the rotor vanes or side sheets, and without causing an undue leakage of air through the feeder.

A still further object of my invention is to provide a vacuum feeder having a movable side wall which may be removed, affording access to the rotor for the renewal or adjusting of flights without further dismantling the feeder or the apparatus to which it is connected.

A still further object of my invention is to provide a vacuum feeder with a movable side wall and stabilizing parts which are adapted to move to accommodate the wall to large masses of material without unduly breaking the seal through the feeder and affording a constant contact between the sealing means on the rotor and the movable side wall.

Vacuum feeders having a movable side wall have heretofore been proposed, but all with which I am familiar have been built into and made a part of the apparatus with which they were connected. The only way access could be had to such a feeder was through the apparatus with which it was associated. Furthermore, such vacuum feeders had the side wall hinged above the rotor so that when forced to move outwardly at one part by a large lump or wad of material being handled, would move out altogether, breaking the air seal through the feeder.

These and other difficulties are overcome in accordance with my invention in which the feeder is in a separate casing from the apparatus with which it connected, and may be attached and removed without dismantling the apparatus with which it is associated. In order to guard against the breaking of the air seal due to the passage of large wads or lumps of material through the feeder, I provide a movable side wall which is yieldably connected to the casing of the feeder opposite the upper part of the rotor and also at the bottom opposite the lower part of the rotor so that the movable wall may move outwardly at the top or the bottom without appreciably affecting the other edge of the wall. The rotor thus maintains a seal through the apparatus at substantially all times. The movable side wall having only a yielding connection with the rest of the feeder may be readily removed to give access to the rotor for any repairs or replacements to the vanes.

Apparatus embodying features of my invention is illustrated in the accompanying drawing forming a part of this application, in which Fig. 1 is an end elevational view of the apparatus;

Fig. 2 is a side elevation thereof with parts in section;

Fig. 3 is a cross section taken along the line III—III of Fig. 2;

Fig. 4 is a detail sectional view of one of the rotor vanes; and

Fig. 5 is a detail sectional view showing the means for sealing the rotor heads against leakage.

Referring to the drawing for a better understanding of my invention, I show my improved feeder in Figs. 1 and 2 as being associated with some suitable apparatus 10, such as, for example, a cotton separator. The feeder is comprised of a housing having heads 11 and 12. The heads are connected on one side by a sheet 13 forming an arcuate stationary wall. Along the upper edge of the sheet 13 is a stiffening rail 14 which may be formed of thin gauge metal bent to the shape shown or other shape to add rigidity. Similarly, along the lower edge of the sheet 13 extends a bottom rail 16. On the opposite side of the housing the heads 11 and 12 are connected at the top by an upper rail 17 formed to provide a flat smooth surface 18 on the underside. At the bottom, the heads are connected by a lower rail 19 formed to provide a smooth flat surface 20 on its upper side.

Mounted between the upper and lower rails 17 and 19 is a movable arcuate housing wall 21, which has relatively close clearance with respect to the housing heads 11 and 12 to prevent substantial ingress of air around the ends. Along the upper edge of the movable wall 21 is provided a sealing strip 22 held in place by a clamp bar 23 and bolts 24. Similarly along the lower edge of the movable wall 21 is a sealing strip 26 held in place by a clamp bar 27 and bolts 28. The housing wall 21 is movable inwardly or outwardly of the housing with respect to the top and bottom rails 17 and 19, and the sealing strips 22 and 26 prevent leakage of air past the upper and lower edges into the feeder. The housing walls are spaced apart to provide an upper opening A into which material being handled falls by gravity, and a lower opening B through which material is discharged.

At 29 I show a rotor shaft extending through the housing which is mounted in frictionless bearings 31, one of the bearing assemblies being shown in section in Fig. 2. The bearings 31 are supported by ribs 25 cast integrally with the housing heads 11 and 12. The shaft 29 may be driven by any suitable means, such as a pulley 30. Fixedly mounted on the shaft 29 are rotor heads 32 and 33, which rotate in openings 35 in the housing heads 11 and 12. At spaced intervals around the rotor heads 32 and 33 are secured short clip angles 34 to the flanges of which are attached sheet metal rotor vanes 36 which thus connect the heads 32 and 33. As will be seen in Fig. 3, the vanes 36 are U-shaped in cross section, with each leg thereof cooperating with and being secured to one of the clips 34, and to an abutting leg of an adjacent vane, thus forming a light rigid structure and one which prevents the passage of air through the body of the rotor. Mounted between the abutting legs of the vanes 36 are flexible flights 37 which may be made of rubber, leather, or similar composition, and which afford a semi-rigid element for feeding the material through the feeder. In advance of each of the flights 37 in the direction of rotation of the rotor are flexible sealing strips 38, which in rotating bear against the walls 13 and 21 to prevent leakage of air through the feeder. The sealing strips 38 and flights 37 are secured between the abutting legs of the vanes 36 by means of bolts 39. The vanes 36, as may be seen in Fig. 3, are inclined rearwardly of a radial direction with respect to the direction of rotation. Also the vanes are constructed so that there is a longer leading or active side of a vane than its associated trailing or inactive side. This provides for a freer discharge of material at the bottom discharge opening B and overcomes any tendency for material, such as cotton, to be carried around by the vanes past the discharge opening.

The rotor heads 32 and 33 are sealed against leakage of air into the casing through the openings 35 by means of packing rings 41 preferably made of soft material, such as felt, and which are mounted in a packing recess 42 formed in the heads 11 and 12, only one of which is shown. The packing rings 41 bear against an outwardly extending flange 43 on the rotor head, and are held in place by a follower ring 44. The follower ring 44 is held in place by means of springs 46 mounted in lugs 47 overhanging the rotor heads and arranged at spaced intervals about the housing heads 11 and 12. The opposite ends of the springs 46 bear against cotter pins 48 extending through suitable openings in the lugs 47.

Mounted in suitable bearings 51 and 52, carried by brackets 53 and 54, which in turn are mounted on the heads 11 and 12, are a pair of oscillating shafts 56 and 57. Secured on the shafts 56 and 57 at one end thereof are crank arms 58 and 59, to the outward ends of which are connected tension springs 61 and 62 respectively. The other ends of the springs 61 and 62 are connected to eye-bolts 63 and 64, respectively, attached to the head 11. The brackets 53 and 54, as shown in Fig. 1, limit the inward movement of the arms 58 and 59. Also secured to the upper oscillating shaft 56 are upwardly extending crank arms 66 and 67, to which are attached links 68 and 69, which in turn are connected to suitable brackets 71 mounted on the movable wall 21 of the housing. Similarly, there are mounted on the lower oscillating shaft 57 downwardly extending crank arms 73 and 74, which are connected by means of links 76 and 77 to brackets 78 carried by the movable wall 21. The provision of yieldable means along the edges of the movable wall 21 opposite the upper and lower sides of the rotor to provide for limited outward movement responsive to an abnormal mass of material in one of the pockets, permits such movement along one edge without materially affecting the other, and thus without breaking the seal through the feeder.

It will be seen from the foregoing description that the U-shaped rotor vanes 36, in cooperation with the rotor heads 32 and 33, form pockets into which the material being handled falls by gravity through the opening A, and is carried around by the rotation of the feeder to be discharged at the bottom at B. The construction of the vanes, together with their sealing strips cooperating with the walls of the housing and the packing around the rotor heads, prevents the ingress of air into the feeder, it being assumed that there is a differential of pressure between that existing in the apparatus 10 and the outside atmosphere. In case a large wad or mass of material falls into one of the pockets, when it encounters the moving walls 21 at the top, the spring 61 permits the wall to move outwardly and the crank arms 66 and 67 cause it to move out evenly across the length of the feeder. This movement takes place without materially changing the position of the lower edge of the wall 21. As the wad of material approaches the lower edge of the wall 21, the spring 62 permits the lower edge to move outwardly, while the spring 61, contracting, causes the upper edge to move inwardly, restoring the seal formed by the approaching feeder flight. In the handling of most materials the action of the vanes and the movable wall will cause such a wad of material to be squeezed into a pocket before it reaches the lower edge of the movable wall so that there is no outward movement along the bottom edge at all. In any case, there is thus maintained a substantial seal against the ingress of air through the feeder in all its positions. In event it becomes necessary to renew or repair the vanes 36, flights 37, or sealing strips 38, or the movable wall 21, the latter may be readily removed by disconnecting the springs 61 and 62 and removing the bearing brackets 53 and 54, whereupon the entire wall 21 may be removed, giving access to the interior. It will also be seen that my improved feeder may be readily attached to or removed from the apparatus with which it is associated, and is not an integral part of such apparatus.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a vacuum feeder, a housing comprising end walls having openings therein, a rotor mounted between the end walls and having heads projecting through the openings, vanes on the rotor providing material handling pockets therein, an arcuate stationary side wall connecting the end walls on one side of the housing, an arcuate side wall on the other side of the housing free to move outwardly with respect to the housing, crank shafts carried by the end walls and extending parallel to the movable side wall on the outside thereof near the upper and lower edges respectively, crank arms on the shafts connected to the movable side wall, separate springs connecting the crank shafts to the end wall to bias the movable side wall inwardly of the housing, and means to limit inward movement of the said side wall relative to the housing.

2. In a vacuum feeder, a housing comprising end walls having openings therein, a rotor mounted between the end walls and having heads projecting through the openings, vanes on the rotor providing material handling pockets therein, an arcuate stationary side wall connecting the end walls on one side of the housing, an arcuate side wall on the other side of the housing free to move outwardly with respect to the housing, crank shafts carried by the end walls and extending parallel to the movable side wall on the outside thereof near the upper and lower edges respectively, crank arms on the shafts connected to the movable side wall, separate springs connecting the crank shafts to the end wall to bias the movable side wall inwardly of the housing, means to limit inward movement of the said side wall relative to the housing, semi-rigid flights mounted on the vanes of the rotor, and flexible sealing strips mounted on the semi-rigid flights on the leading side thereof to prevent leakage of air through the feeder.

JAMES S. REECE.